July 16, 1940.   W. C. GRIMM   2,207,795
FOOD-MAKING MACHINERY
Filed July 1, 1939   4 Sheets-Sheet 1

INVENTOR.
WILLIAM CONRAD GRIMM
BY
Richards & Geier
ATTORNEYS

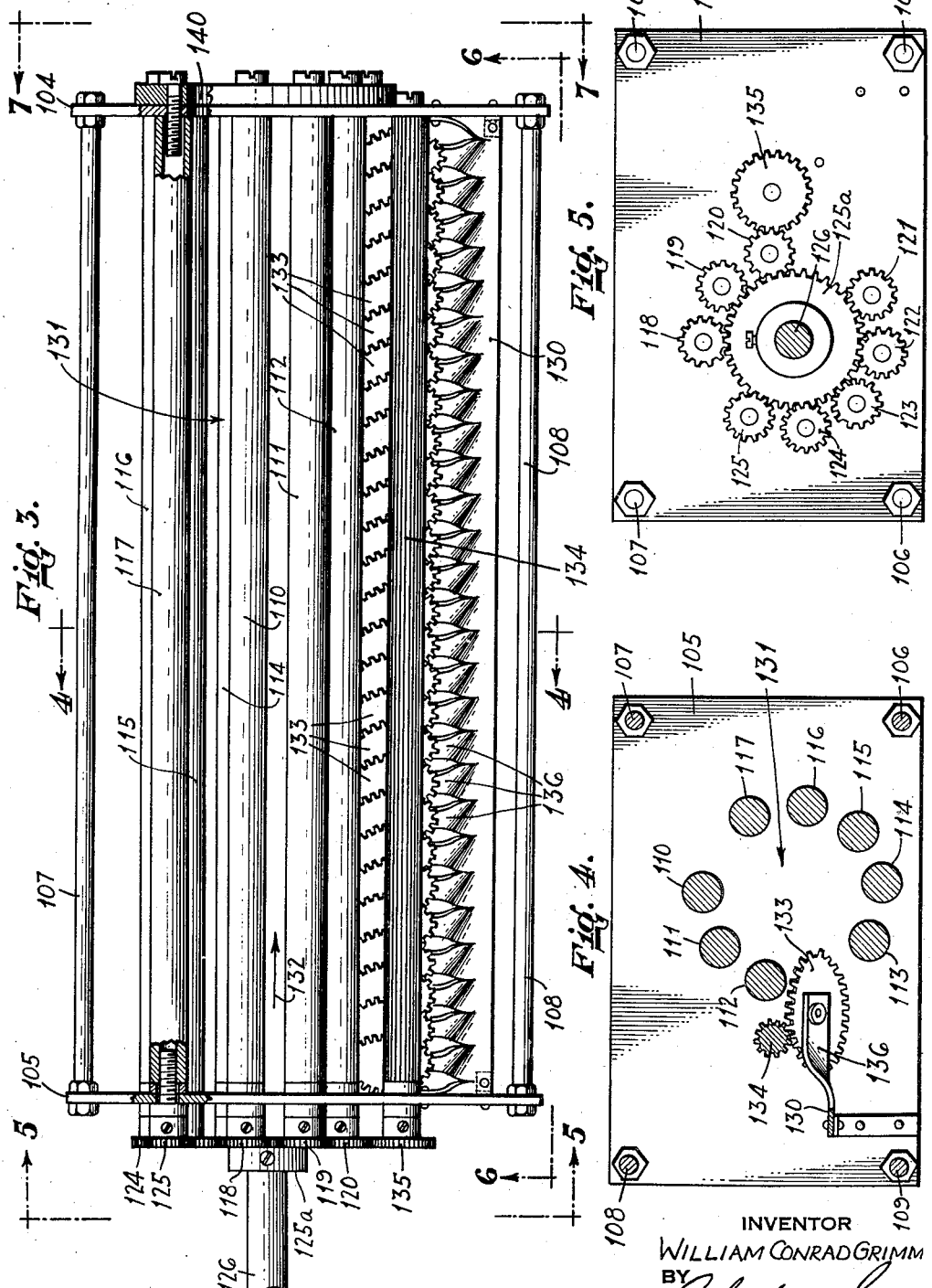

July 16, 1940.  W. C. GRIMM  2,207,795
FOOD-MAKING MACHINERY
Filed July 1, 1939   4 Sheets-Sheet 3
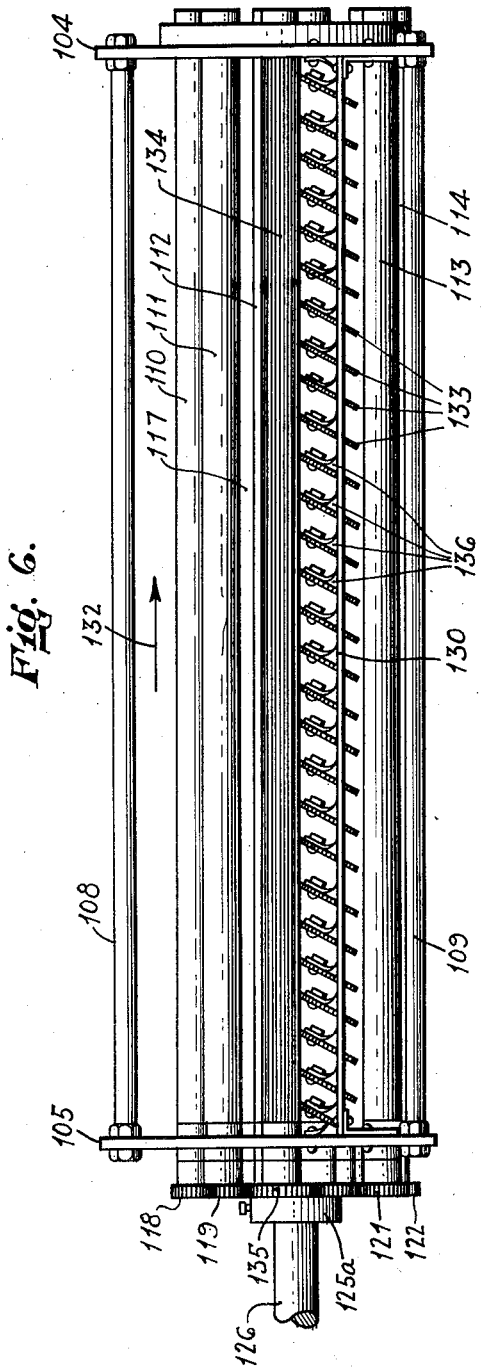
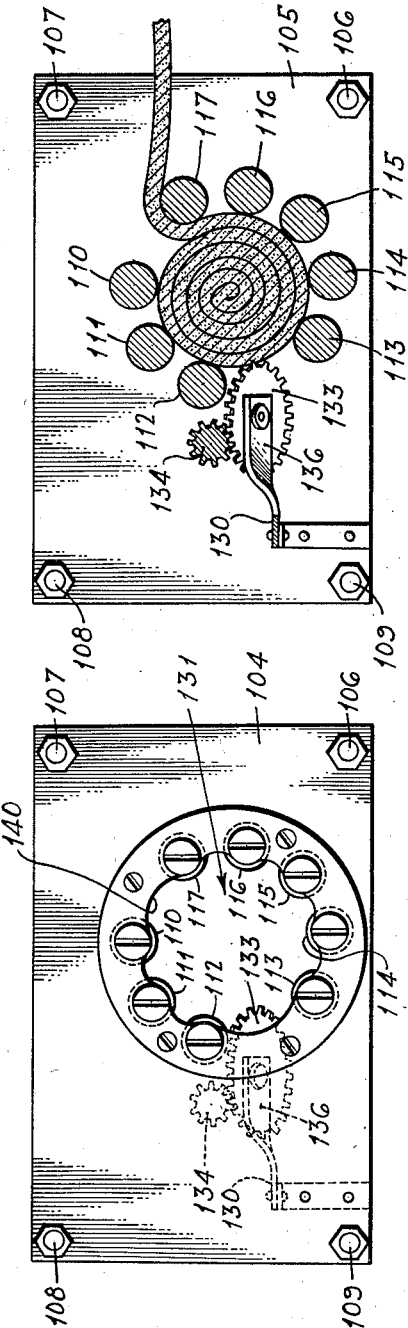
INVENTOR
WILLIAM CONRAD GRIMM
BY
Richards & Geier
ATTORNEYS July 16, 1940.　　　W. C. GRIMM　　　2,207,795
FOOD-MAKING MACHINERY
Filed July 1, 1939　　　4 Sheets-Sheet 4

INVENTOR
WILLIAM CONRAD GRIMM
BY
Richards & Geier
ATTORNEYS

Patented July 16, 1940

2,207,795

UNITED STATES PATENT OFFICE 2,207,795

FOOD-MAKING MACHINERY

William Conrad Grimm, Jersey City, N. J.

Application July 1, 1939, Serial No. 282,355

6 Claims. (Cl. 107—9)

This invention relates to food-making machinery and refers more particularly to a device for kneading and shaping dough used for the making of snake-buns, loaves of bread, rolls or the like.

Heretofore it was necessary to employ either skilled workmen for this purpose, or it was necessary to use complicated and expensive machinery which could replace only a certain part of the necessary manual operations.

An object of the present invention is the provision of a comparatively simple and inexpensive machine used in the making of snake-buns, loaves of bread and the like, by means of which dough can be shaped and formed by entirely mechanical means.

Another object is the provision of mechanical means operating upon the dough and shaping and forming it in such manner that it is ready to be inserted into the baking oven in the form of snake-buns, loaves of bread and the like.

Other objects will be apparent in the course of the following specification.

The objects of the present invention may be realized through the provision of a device comprising rollers through which the dough is passed so that it emerges in the form of a sheet or layer which is wound spirally by means of suitably arranged shafts or rollers. Suitable means are provided to cut the wound layers of dough at predetermined intervals to form snake-buns of a predetermined height.

The same or similar device can be easily aadpted for the shaping of loaves of bread, rolls and the like.

The invention will appear more clearly from the following detailed description when taken in connection with the accompanying drawings showing, by way of example, preferred embodiments of the inventive idea.

In the drawings:

Figure 3 is a top plan view of the rotary shafts attachment for winding the layers of dough.

Figure 4 is a vertical section along the line 4—4 of Figure 3;

Figure 5 is an elevational end view along the line 5—5 of Figure 3;

Figure 6 is a front elevational view along the line 6—6 of Figure 3;

Figure 7 is an end elevation along the line 7—7 of Figure 3;

Figure 8 is similar to Figure 4 and illustrates the winding of the dough layers;

Figure 1:
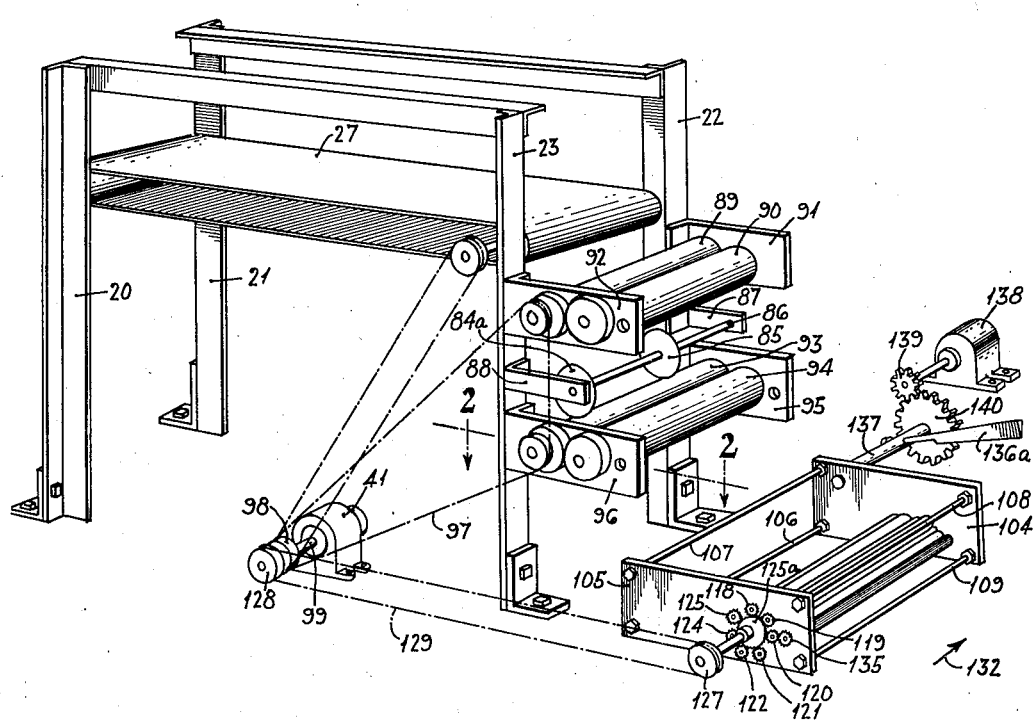
Figure 1 is a perspective view of a machine constructed in accordance with the principles of the present invention.

The machine shown in Figures 1 to 8 of the drawings comprises a frame having four vertical supports 20, 21, 22 and 23 (Fig. 1) carrying a horizontal endless sheet 27.

A device used to control the volume of dough is situated substantially underneath one end of the sheet 27. This device comprises two cutting discs 84a and 85 carried by a shaft 86 which is attached to the supports 22 and 23 by the two projections or angle irons 87 and 88.

Figure 2:
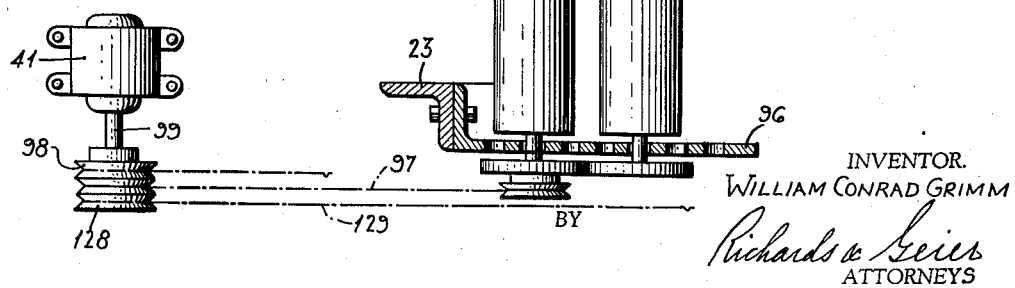
Figure 2 is a section along the line 2—2 of Figure 1.

Two pairs of rollers are disposed above and below the shaft 86. The first pair of rollers 89 and 90 is rotatably mounted in the angle irons 91 and 92 which are attached to the supports 22 and 23, respectively. A second pair of rollers 93 and 94 is situated below the rollers 89 and 90 and is rotatably mounted in the angle irons 95 and 96 which are also attached to the supports 22 and 23. The positions of these rollers may be conveniently varied and adjusted, as shown in Figure 2.

As shown diagrammaticaly in Figure 1, the rollers 89 and 93 are driven by means of an endless belt or chain 97 which pass over a pulley 98 rotatable along with a shaft 99. The shaft 99 is driven by the motor 41.

The device for winding the flat layers of dough is situated substantially below the pair of rollers 93 and 94 and comprises plates or walls 104 and 105 which are maintained in vertical predetermined positions by the distancing rods 106, 107, 108 and 109.

As shown more clearly in Figures 3 to 8 of the drawings, eight shafts 110 to 117 are circumferentially disposed within a space 131 between the walls 104 and 105 and are rotatably supported by these walls. Gear wheels 118 to 125 are carried by the shafts 110 to 117, respectively, and mesh with a central gear wheel 125a which is rotatable along with a shaft 126. The shaft 126 carries a pulley 127 (Fig. 1) which is operated from the shaft 99 by means of a pulley 128 and an endless drive 129.

The transporting means used for moving the dough within the space 131 surrounded by the shafts 110 to 117 in the direction of the arrow 132 shown in Figure 1, comprise a comb-like plate 130 provided with turned-up inclined blades 136 carrying a plurality of rotatably mounted gear wheels 133 (Figs. 3, 4, 6, 7 and 8). The gear wheels 133 are rotated by a pinion shaft 134 which is driven by a gear wheel 135 (Figs. 1, 3, 5 and 6) meshing with the gear wheel 120.

When the transporting gear wheels 133 are rotated, they will grip the dough after it has been wound in the form of a roll illustrated in Figure 8, and will transport it in the direction of the arrow 132, shown in Figure 1.

Any suitable knife 136a may be situated close to the outer surface of the plate or wall 104 and may be driven by a shaft 137 rotated by a motor 138 through the medium of gear wheels 139 and 140. The knife 136 is used to separate the rolled dough into snake-buns of predetermined length.

Furthermore, any suitable transporting device not shown in the drawings may be used for the purpose of transporting the snake-buns to a baking oven.

The described machine operates as follows:

The dough is placed upon the endless sheet 27 (Figure 1) and then the motor 41 is started.

The dough passes between the two rollers 89 and 90 and also between the two rollers 93 and 94. Thus the dough acquires the form of a comparatively thin layer.

The rollers 89 and 93 are rotated in the same direction by the drive 97 which is operated by the motor 41. The discs 84a and 85 will cut or trim the edges of the layer of dough, preventing excess dough from entering and forming a pocket.

The first layer emerging from the space between the rollers 93 and 94 is guided by hand by the operator into the space 131 (Fig. 4) enclosed by the shafts 110 to 117, the layer being introduced between the shafts 110 and 117. The gear wheels 118 to 125 (Fig. 5) of the shafts 110 to 117 are rotated by the gear wheel 125a driven from the motor 41 by means of the endless drive 129.

Due to the rotation of the shafts 110 to 117, the dough is wound within the space 131 in the form of a spiral (Fig. 8).

Due to the adhesiveness of the dough, it will continue to flow automatically from the space between the rollers 93 and 94 and into the space 131 as soon as the first original layers of the dough have been guided by the operator.

The gear wheels 133 carried by the comb-like plate 130 (Fig. 3) and driven by the pinion shaft 134, will engage the roller layers of dough and will shift them in the direction of the arrow 132 (Fig. 1) and through an opening provided in the plate 104.

The rolled dough is cut up into small pieces by the knife 136a and is transported to the baking oven.

Figure 9:
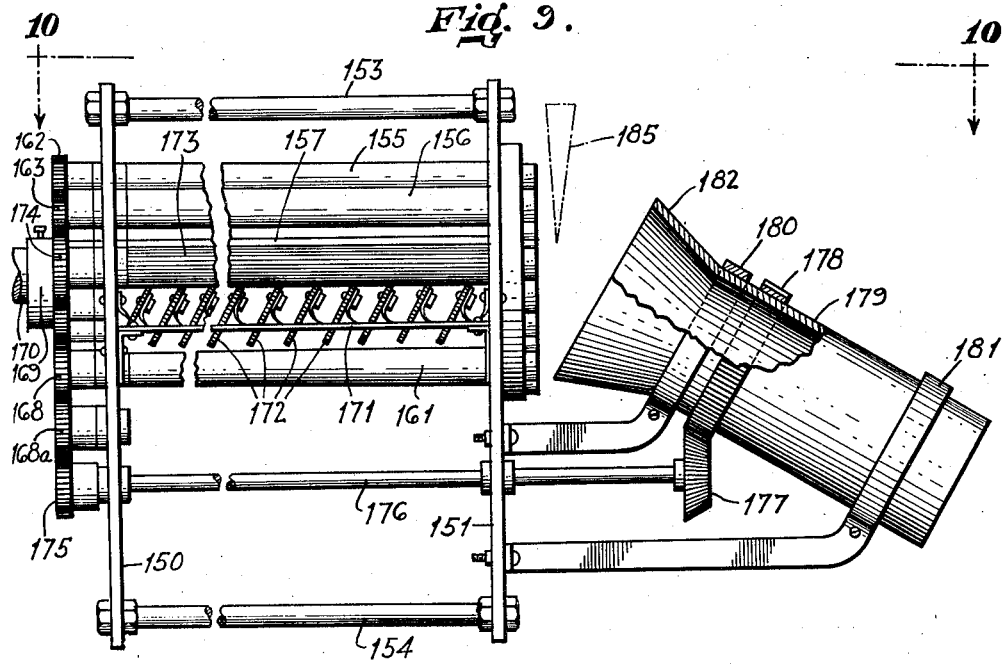
Figure 9 shows in front elevation a device used for forming dough intended to be baked into loaves of bread of standard size.
Figure 10:
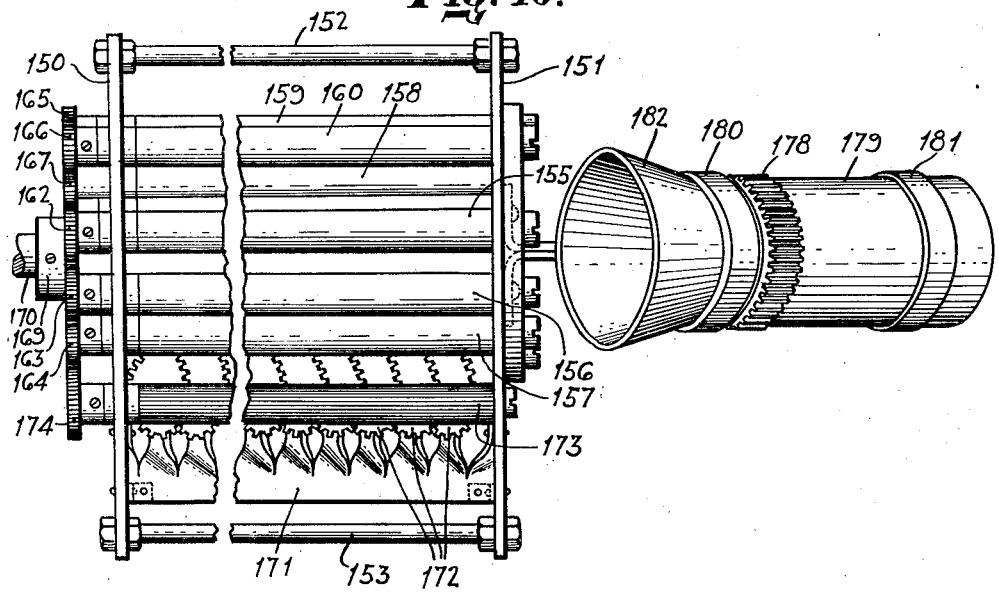
Figure 10 is a top view along the line 10—10 of Figure 9.

The attachment shown in Figures 9 and 10 of the drawings is used for the manufacture of loaves of bread. The device for winding the layers of dough is substantially similar to the one described and comprises plates or walls 150 151 which are maintained at a distance from each other by the distancing rods 152, 153 and 154. Shafts 155 to 161 are carried by the plates 150 and 151 and are arranged along the circumference of a circle. These shafts are firmly connected with gear wheels 162 to 168, which are driven by a central pinion 169 carried by the shaft 170.

The comb-like plate 171 is firmly connected to the plates 150 and 151 and carries a plurality of small gear wheels 172. The gear wheels 172 are rotated by a pinion shaft 173 which is rotatable along with a gear wheel 174 meshing with the gear wheel 164.

In this construction, as in the previously described one, the gear wheels 172 are used for shifting the dough in the direction from the plate 150 toward the plate 151. The gear wheel 167 meshes with an idler gear 168a which, in its turn, meshes with the gear wheel 175. The gear wheel 175 is mounted upon an elongated shaft 176 which extends beyond the plate 151 and which carries a bevel gear 177.

The bevel gear 177 meshes with an annular gear crown 178 which is firmly attached to the outer circumference of a tube or sleeve 179. The tube 179 is rotatably carried by two annular supports 180 and 181 which are attached to the plate 151. The conical end 182 of the tube 179 is situated close to an opening formed in the plate 151.

The operation of this device is substantially similar to the one described. Layers of dough introduced into the space enclosed by the shafts 155 to 161 are wound spirally therein due to the rotation of these shafts. The gear wheels 172 which are driven by the pinion shaft 173 will shift the rolled dough in a direction toward the plate 151 and will cause this dough to emerge through an opening formed in the plate 151. The dough will be collected in the conical end 182 of the sleeve 179 and will pass through this sleeve while the sleeve is being rotated by the shaft 176. A knife 185 which is indicated diagrammatically in Figure 15, will operate at predetermined intervals to cut off pieces of dough. These pieces will then be ready to be introduced into a baking oven and baked into loaves of bread.

It is apparent that the specific illustrations shown above have been given by way of illustration and not by way of limitation and that the structures above described are subject to wide variation and modification without departing from the scope or intent of the invention, all of which variations and modifications are to be included within the scope of the present invention.

What is claimed is:

1. Food-making machinery, comprising a plurality of spaced parallel shafts enclosing a substantially cylindrical space, means rotating said shafts to wind a layer of dough introduced into said space in contact with at least one of said shafts, and transporting means projecting into said space and engaging said dough to transport it in a direction parallel to those of said shafts.

2. Food-making machinery, comprising a plurality of spaced parallel shafts enclosing a substantially cylindrical space, means rotating said shafts to wind a layer of dough introduced into said space in contact with at least one of said shafts, a plurality of parallel gear wheels inclined in relation to the axial directions of said shafts and projecting into said space to engage said dough, and means engaging said gear wheels for rotating the same to transport said dough in a direction parallel to said axial directions.

3. Food-making machinery, comprising a plurality of spaced parallel shafts enclosing a substantially cylindrical space, means rotating said shafts to wind a layer of dough introduced into said space in contact with at least one of said shafts, a plurality of parallel gear wheels inclined in relation to the axial directions of said shafts and projecting into said space to engage said dough, a comb-like plate carrying said gear wheels, a frame carrying said plate and said shafts, and means rotating said gear wheels to transport said dough in a direction parallel to said axial directions.

4. Food-making machinery, comprising a plurality of spaced parallel shafts enclosing a substantially cylindrical space, a separate gear wheel firmly connected with each shaft, a rotary gear wheel meshing with the gear wheels carried by the shafts for rotating said shafts to wind a layer of dough introduced into said space in contact with at least one of said shafts, a plurality of parallel gear wheels inclined in relation to the axial directions of said shafts and projecting into said space to engage said dough, a pinion shaft engaging the last-mentioned gear wheels, and means connecting one of the first-mentioned gear wheels with said pinion shaft for rotating the same to transport said dough in a direction parallel to said axial directions.

5. Food-making machinery, comprising a plurality of spaced parallel shafts enclosing a substantially cylindrical space, means rotating said shafts to wind a layer of dough introduced into said space in contact with at least one of said shafts, transporting means projecting into said space and engaging said dough to transport it in a direction parallel to those of said shafts, a rotary container for the dough transmitted by said transporting means, and means separating the dough in said container from the dough in said space.

6. Food-making machinery, comprising a plurality of spaced parallel shafts enclosing a substantially cylindrical space, inclined transporting discs projecting into said space, a rotary container adjacent said space, means rotating said shafts, said discs and said container, whereby a layer of dough introduced into said space in contact with at least one of said shafts is wound spirally within said space and is transported by said discs from said space into said container and means separating the dough in said container from the dough in said space.

WILLIAM CONRAD GRIMM.